United States Patent [19]
Johnson

[11] 4,209,917
[45] Jul. 1, 1980

[54] APPARATUS FOR SUPPORTING ARTICLES DURING EXPOSURE TO A GASEOUS OR VAPOROUS MEDIUM

[75] Inventor: Ian L. Johnson, Melton Mowbray, England

[73] Assignee: Abaline Limited, Frog Island, England

[21] Appl. No.: 915,281

[22] Filed: Jun. 13, 1978

[30] Foreign Application Priority Data

Jun. 15, 1977 [GB] United Kingdom ............... 24987/77

[51] Int. Cl.² ............................................. F26B 13/10
[52] U.S. Cl. ......................................... 34/149; 34/189; 271/189
[58] Field of Search .................. 34/189, 190, 149, 171, 34/172, 237; 271/191, 189, 73, 67

[56] References Cited

U.S. PATENT DOCUMENTS

| 1,739,505 | 12/1929 | Cunningham | 34/189 |
| 3,567,047 | 3/1971 | Clausen | 271/191 X |

FOREIGN PATENT DOCUMENTS

| 379414 | 8/1923 | Fed. Rep. of Germany | 34/149 |
| 943563 | 3/1949 | France | 34/189 |
| 488062 | 12/1953 | Italy | 34/149 |

*Primary Examiner*—Albert J. Makay
*Assistant Examiner*—Harold Joyce
*Attorney, Agent, or Firm*—Charles E. Brown

[57] ABSTRACT

The invention provides apparatus suitable for use for example in drying or treating articles such as sheets of paper, which comprises an endless conveyor means arranged to form a plurality of support surfaces for said articles while traversing an operative zone in which the articles are subjected to a medium and to retract the surfaces into an unformed condition outside of that zone, the surfaces comprising a stack or column while in that zone, advancing and retraction means to advance to form each support surface at the entry to the zone, and means to move the formed surfaces through the zone, said advancing and retraction means acting to retract each surface successively in the region of the exit from said zone. One example of the invention provides a flexible web of material which is formed into horizontal loops to provide the support surfaces.

13 Claims, 9 Drawing Figures

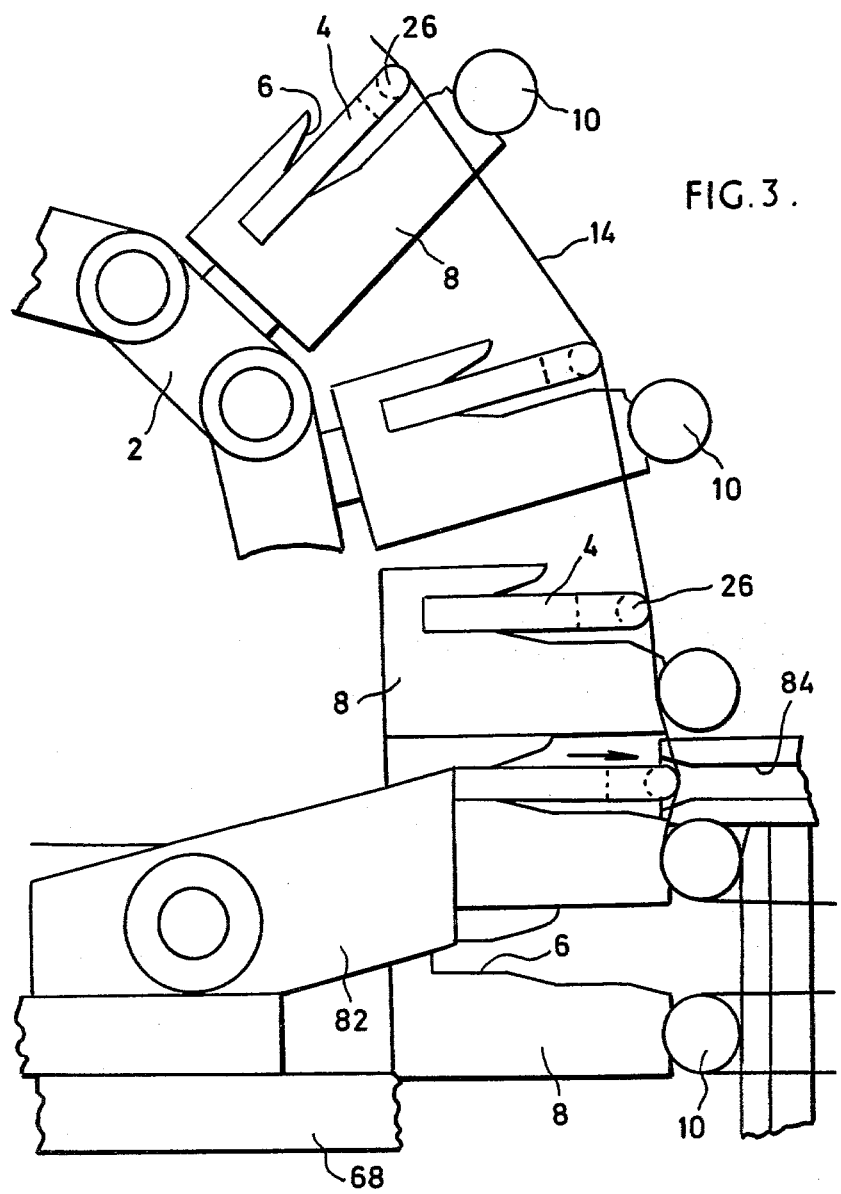

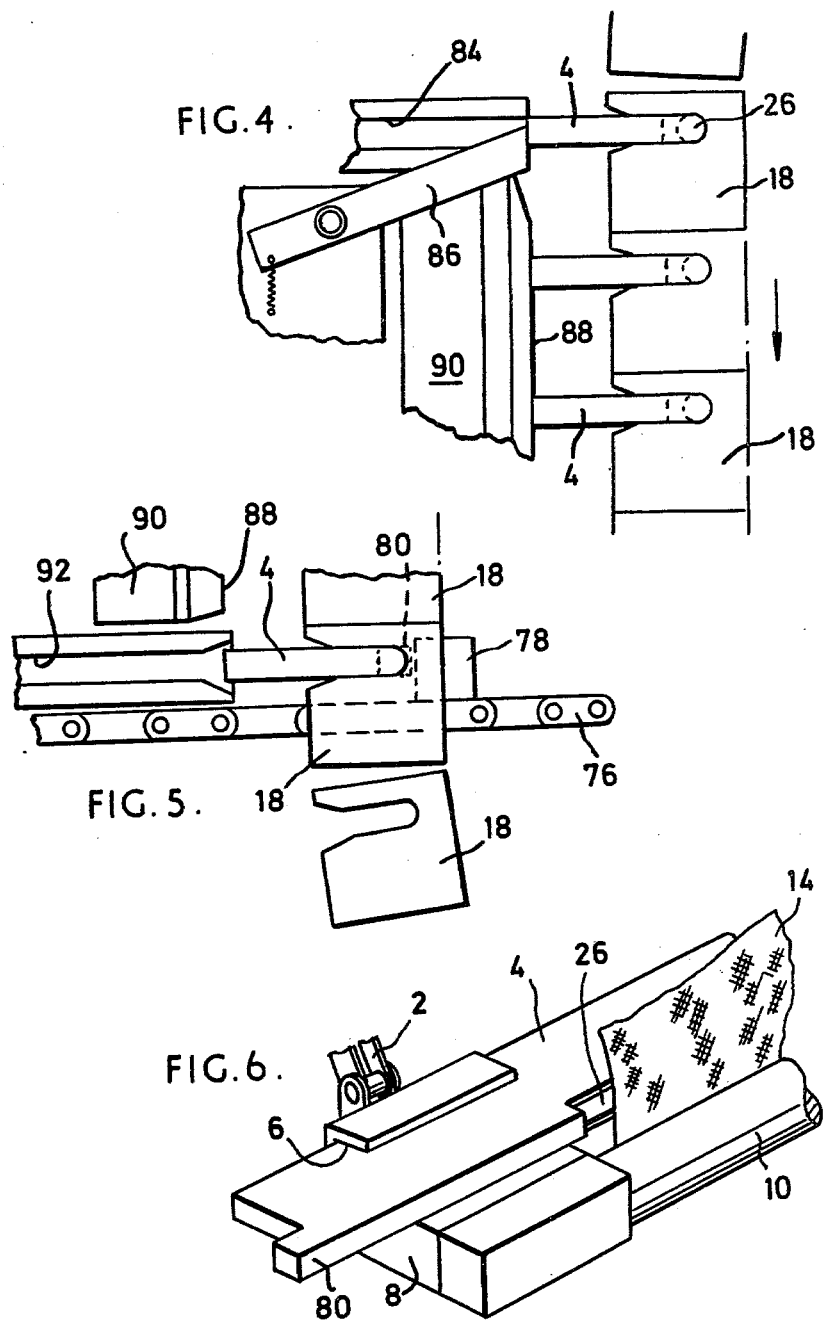

APPARATUS FOR SUPPORTING ARTICLES DURING EXPOSURE TO A GASEOUS OR VAPOROUS MEDIUM

BACKGROUND OF INVENTION

The present invention relates to apparatus for exposing a plurality of articles to a gaseous or vaporous medium in a successive manner.

A known apparatus for exposing a continuous supply of articles to a gaseous or vaporous medium for instance machines for drying articles such as printed material, have often consisted of a long, substantially horizontal, conveyor belt on which articles to be dried are placed. The articles are conveyed along the belt to a drying station at which they are dried as they pass through.

A disadvantage of this type of machine is that, since they are longitudinally orientated they require a great deal of floor space the belt being necessarily of extended length.

Alternatively, it is often customary to dry articles at the drying station by placing them on drying racks, where the articles dry at ambient temperature by evaporation. The racks may comprise a frame having a series of wire mesh trays which are orientated horizontally whilst articles are loaded on to them, the trays having been lowered sequentially from an inclined position to accept the work. A disadvantage of these trays is that sufficient time must elapse for the last article to dry before the trays can be cleared, thus necessitating the use of at least two drying racks at the same time.

Further existing types of drier include the vertical tower dryer and the so-called wicket dryer. The vertical tower dryer comprises a system of trays supplied to a housing arranged to accommodate a column of trays carried upwardly through a heating zone, each tray as it reaches the top of the column being transferred horizontally to a cooling section of the housing, through which it then descends in a second column before delivery to a stacking device. These machines, although taking up comparative little floor space, are very tall, and require adequate roof height.

A wicket dryer is a machine having a horizontal layout, comprising a conveyor belt with slanting projections or flights, each arranged to support a sheet at an inclined angle as the upper, operative rum of the conveyor passes through the heating zone. As each flight passes over the end of the conveyor to commence a lower return run, the articles may be removed if required, or they may be retained in place and returned to a stacking device adjacent the commencement of the operative run, if preferred. In any case, this machine takes up a great deal of factory floor space.

BRIEF SUMMARY OF INVENTION

The invention therefore provides apparatus for supporting articles during exposure to a gaseous or vaporous medium, comprising endless conveyor means arranged to form a plurality of support surfaces for said articles while traversing an operative zone in which the articles are subjected to a medium and to retract the surfaces into an unformed condition outside of that zone, said surfaces comprising a stack or column while in that zone, advancing and retraction means to advance to form each support surface at the entry to the zone, and means to move the formed surfaces through the zone, said advancing and retraction means acting to retract each surface successively in the region of the exit from said zone.

It is to be understood that the term "stack or column" describes the cases where the support surfaces are arranged either vertically above one another or are arranged in inclined or stepped relationship. The surfaces of the supports need not necessarily be aligned in parallel planes although this will usually be preferred.

The apparatus may advantageously include support surfaces which are flexible and the advancing and retraction means retract each support surface into an unformed condition by rolling it from beneath the article supported thereon to prevent a shearing movement between the articles and the support surface.

In an example of the invention a continuous web of flexible material is arranged to move with the conveyor means and to provide said support surfaces, said advancing and retraction means including a plurality of loop forming devices mounted on the conveyor means, each device being extendible outwardly of the conveyor device at the entry to the zone to form an elongate loop of said material, an upper run of which forms one support surface, each loop forming device retracting as it approaches the exit of the zone so as to withdraw the loop and unform its support surface. Advantageously the web may be perforated to permit permeation of the gaseous or vaporous medium.

The support surfaces may alternatively be provided for example, by a series of advanceable and retractable webs each rolled out and spring-loaded for return in the manner of a roller blind. Alternatively, the supports may be provided by a flexible substantially planar web or mesh, or an assembly of spaced belts or cords. In other examples, each support may be provided by at least one collapsible bag which in its retracted state is wound under on itself in a coil, the support being advanced by inflating the or each bag with compressed air which causes the or each bag to unwind and maintain itself in a substantially horizontal position an upper wall of the bag providing an article support surface.

Conveniently, the advance of a loop-forming device at the entry to the zone may be simultaneous with the retraction of a loop-forming device at the exit from the zone, so that tension in the continuous web of material is maintained at a substantially constant level.

Alternatively, where the advance and retraction of the loop-forming devices is not simultaneous, a tensioning device may be provided to assist in the maintenance of tension in the support surface of the loop being retracted at the exit from the zone.

When the apparatus is used as a drying machine it will be found particularly useful in the drying of printed sheets such as screen prints.

BRIEF DESCRIPTION OF DRAWINGS

There will now be given a detailed description of one example of apparatus according to the invention. It will be understood that the description which is to be read with reference to the accompanying drawings is given by way of example only and not be way of limitation.

In the drawings:

FIGS. 3, 4 and 5 are fragmentary views, to an enlarged scale, of portions of the apparatus as shown in FIG. 1;

FIG. 6 is a perspective view of an end portion of a part of the advancing and retracting means.

DETAILED DESCRIPTION OF DRAWINGS

Figure 1:
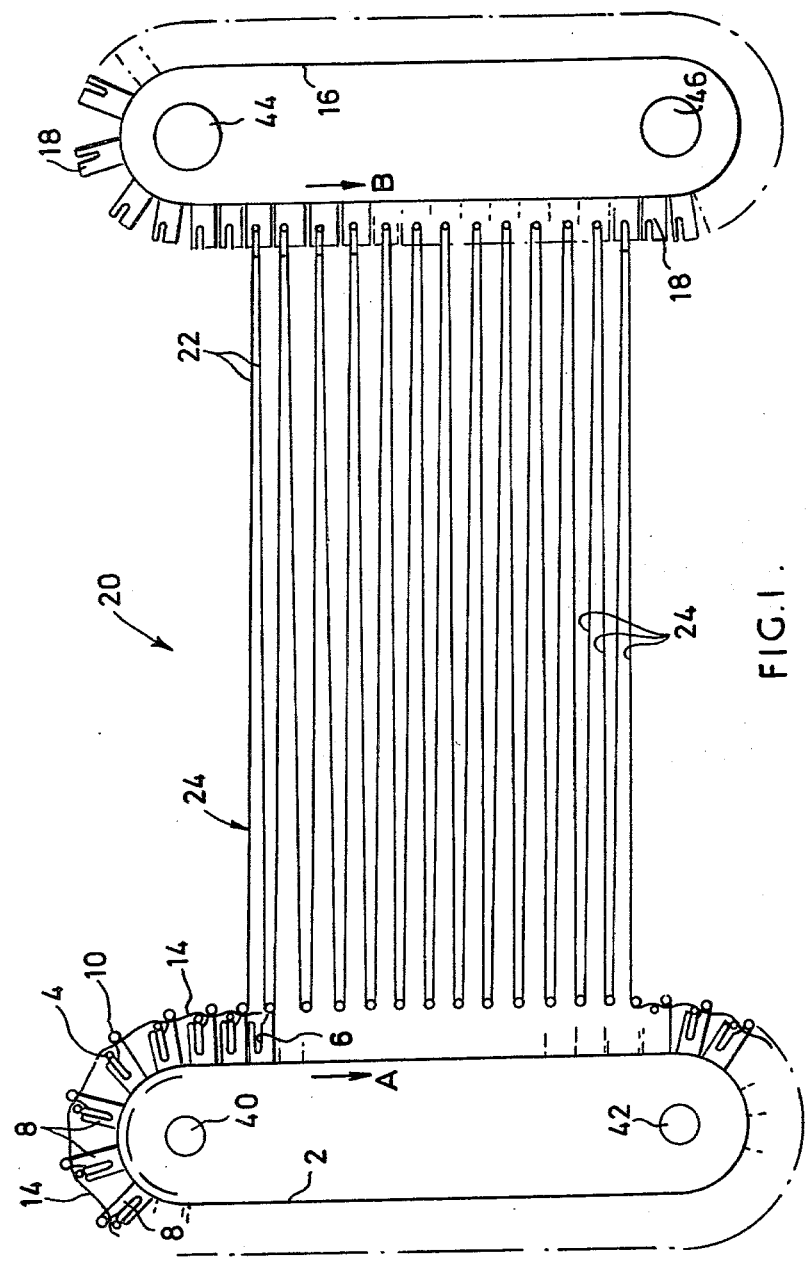
FIG. 1 is a diagrammatic side elevational view of the apparatus.

FIG. 1 shows an apparatus suitable for the drying of printed sheets and is intended for use in an enclosed housing 1 (shown only in FIG. 9) through which warm air is drawn. The apparatus comprises two vertically disposed endless conveyor means 2 supporting between them a plurality of thin metal slats 4, end portions of which are received in recesses 6 of brackets 8 secured to the conveyors 2 (see also FIG. 6). These brackets also support bars 10 secured firmly thereto and spanning the distance between the two conveyors 2, only one side of which is visible in FIG. 1, its presence obscuring the other side.

Passing between the slats 4 and the bars 10 is an endless web 14 of flexible polyester mesh arranged to travel with the conveyor means 2 in the direction shown by arrow A. Arranged so as to confront the two conveyors 2 spanned by their slats and bars, are two further conveyor means 16 movable in synchronism with the conveyors 2 but in the opposite direction (arrow B), and supporting a plurality of slat-receiving members 18. The area 20 between the confronting pairs of conveyors 2 and 16 will be referred to as the operative zone of the apparatus.

Figure 9:
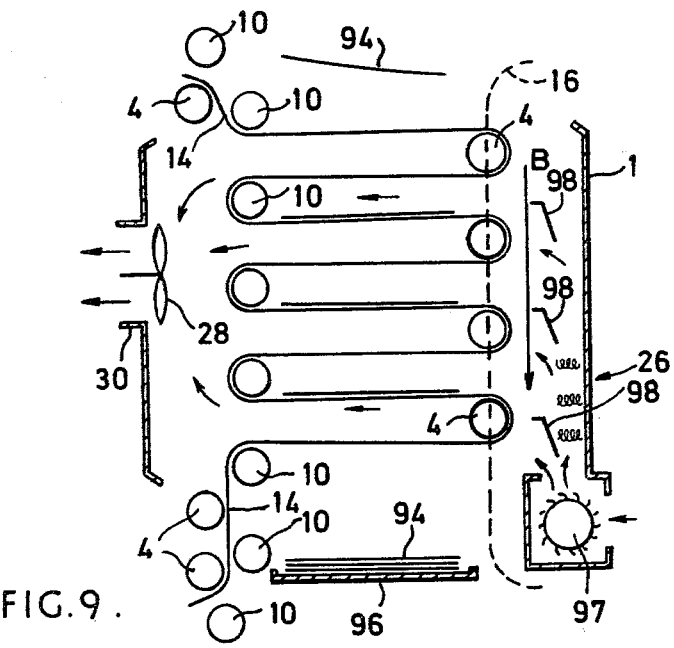

As each bracket 8 approaches the zone 20, its associated slat 4 is caused to advance outwardly from the conveyor 2 and traverse the zone to be received in the confronting slat receiving member 18. This advancing action causes a loop 22 to be formed in the web 14 which traverses the zone 20. An upper surface 24 of this loop provides a support surface for a printed sheet to be dried by the warm air passing through the zone from a heater 26 to an extraction fan 28 in a duct 30 of the housing 1 (FIG. 9). When this loop is formed and the slat 4 secure in the member 18, the conveyor continues its movement, which in the present example is step-wise to move the next slat 4 into position for advancing so that the next loop may be formed across the zone.

As each loop 22 descends in the zone 20, it nears the exit thereof at which the slat 4 is returned to its associated bracket 8 of the conveyor 2.

It is arranged that the advancement of the slat entering the zone 24 is simultaneous with the retraction of the slat leaving the zone, so that the slack caused by the retraction of the lower slat is taken up by the advancement of the top slat in the zone, the web 14 running freely through the slats 4 and rods 10 of the ascending portion of the conveyor 2. In the present example the leading edge of each slat is provided by a roller 26 (FIG. 3) to facilitate smooth running of the web 14.

It is envisaged that in other examples of the invention where the advance and retraction of the slats is not simultaneous, an additional tensioning means may be required, which may take the form of a spring-loaded or weighted roller.

The operation of the slat advancing and retraction means will now be described. It will be appreciated that the conveyor means and slat-engaging devices are operable to drive the slats in a uniform manner and are thus adapted to drive both ends of the slats, being duplicated where necessary in order to achieve this.

Figure 2:
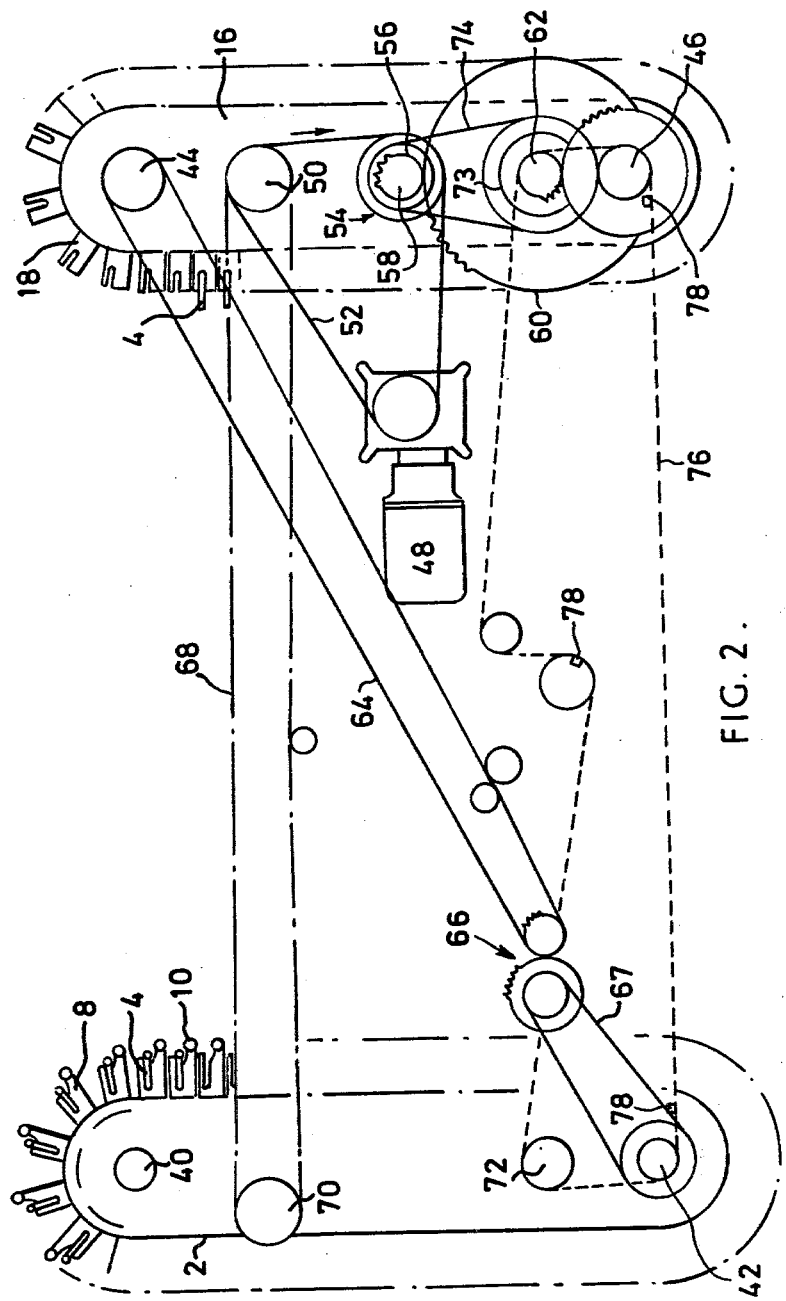
FIG. 2 is a diagrammatic side elevational view of actuating mechanism of the apparatus with a support frame removed for the sake of clarity.

Referring to FIG. 2, the conveyor means 2 travel around a rear upper mainshaft 40 and a rear lower main shaft 42. The conveyor means 16 travel at the same rate but in the opposite direction around a front upper main shaft 44 and a rear lower main shaft 46. For convenience of access to the apparatus, the main shaft 44 comprises two stub shafts.

A reversible drive motor 48 drives a front upper drive shaft 50 through a chain belt 52. The belt 52 also drives a lay shaft 54 provided with a gear 56 engagable through a clutch 58 with a gear 60 mounted on a lower drive shaft 62.

An endless chain belt 64 runs between the top front main shaft 44 and a transfer gear arrangement indicated at 66 to connect via a subsidiary belt 67 with the rear lower main shaft 42 about which the conveyor means 2 travels. All belts in the present apparatus are chain belts.

Thus, drive from the motor 48 causes stepwise movement of the conveyor devices 2 and 16 in the desired directions through engagement of the clutch 58. Drive is also imparted to further belts 68 (only one visible) each mounted between the drive shaft 50 and an idler shaft 70, so that these belts partake of a reciprocatory movement as the motor 48 operates. However, the clutch 58 disengages during the opposite movement of the motor 48 and thus the conveyor means remain stationary during the operation of the motor to advance the slats.

A second, lower idler shaft 72 receives two chain belts 76 (only one visible) which also pass around the lower main shafts 42 and 46. These chain belts 76 are arranged to have a length exactly three times that of the distance of travel of each slat 4 across the zone 20. Three catches 78 are equidistantly spaced on each chain belt 76. These are positioned so that when the chain belts 76 are driven, a catch on each belt engages a projection 80 provided are on each end of the lowermost slat 4 (see FIG. 6), to pull the slat from right to left as viewed in FIGS. 1 and 2. The belts 76 only operate in one direction, that is, clockwise, since they are driven by a belt 74 from shaft 54, turning the shaft 62 through a free-wheel device 73, ensuring operation of the belts 76 only during the advance of a slat by belts 68.

At the same time, it will be seen that the belt 68 is being driven to advance the top-most slat 4 from left to right, the driving connection being made through a pivotal drive member 82 mounted on the belt 68 (FIG. 3) which engages the slat 4 to impel it across the zone 20. As the slat travels in recesses 84 towards the member 18, a pivotal catch 86 (FIG. 4) operates to prevent return of the slat 4 as the belts 68 return on the opposite action of the motor 48. As the conveyor means 16 moves downwardly in its stepwise progress, so the slats 4 contact a guide surface 88 on a guide member 90 which maintains their position in the slat-receiving members 18.

As each slat completes its descent, it leaves the guide surface 88 as shown in FIG. 5 and, as the catch 78 engages with end portions 80, leaves the member 18 to enter a return recess 92 under the influence of the chain belts 76.

Figure 7:
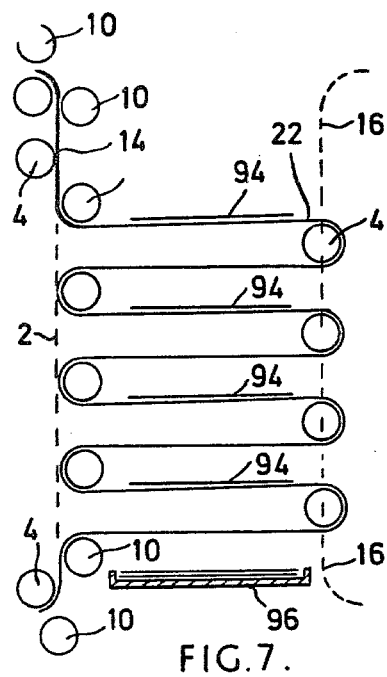
FIGS. 7, 8 and 9 show schematically three stages in the operation of the apparatus.
Figure 8:
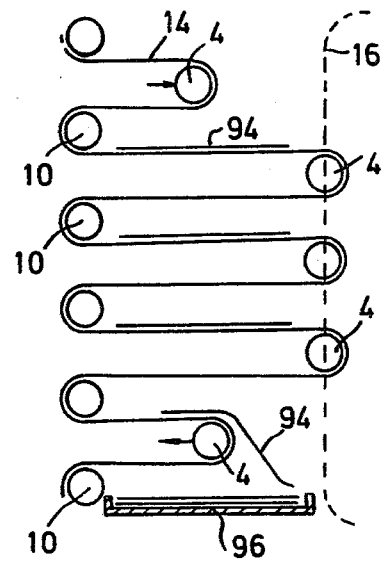

The operation of the machine may briefly be summarised as follows, with reference to FIGS. 7 to 9, in which the various parts of the aparatus are shown diagrammatically.

As the two conveyor means 2 and 16 are progressed stepwise, a sheet of freshly printed material 94 is placed on each newly advanced loop 22 of the web 14. As soon as the next loop is being formed (FIG. 8), the lowest loop is being retracted and because the loop is being rolled away from under the lowest sheet 94, the sheet is gently lowered into a stacking tray 96 which is automatically lowered to maintain the top of the stack at a constant level. This is achieved by a photoelectric monitor cell in known manner. Thus a neatly arranged stack of sheets is obtained.

Thus each sheet of material progresses downwardly through the stack or column and by the time the appropriate slat 4 is retracted has been dried by the warm air blown upward by a blower 97 past the heater 26. This air is deflected upwardly by a system of baffles 98 to ensure satisfactory circulation.

Although the apparatus shown is controlled and powered by electricity, any other suitable means may be used, for instance compressed air or hydraulic power may be used as a power source and fluid logic elements may be used to control the machine.

Although the machine described relates to the drying of articles, it is to be understood that apparatus according to the invention could be used in a machine for other types of processing, for example subjecting articles to a particular reative vapour.

In the latter case special ducting will be required to limit the area of circulation of the vapour involved but it will be readily apparent how this may be arranged.

We claim:

1. Conveying apparatus for supporting sheets during exposure to a gaseous medium, said apparatus comprising a first endless conveyor having an upstanding run, a second endless conveyor having an upstanding run substantially parallel to said first endless conveyor upstanding run, each of said endless conveyors including a pair of endless drive members carrying brackets with the brackets of each pair of drive members being aligned, the aligned brackets of said first endless conveyor being joined by fixed support bars extending therebetween and connected thereto, movable support bars, each of said brackets of said first endless conveyor further having carrier means for said movable support bars disposed between said fixed support bars, said brackets of said second endless conveyor having carrier means for said movable support bars, an endless supporting web associated with said first endless conveyor and generally disposed between paths of movement of said fixed support bars and said movable support bars, drive means for driving said endless conveyors in unison, feed means extending between upper portions of said runs for sequential engagement with said movable support bars carried by said first endless conveyor brackets and moving each movable support bar between adjacent ones of said fixed supports across the space between said runs and depositing each movable support in one of second endless conveyor brackets while pulling a generally horizontal loop of said endless supporting web, retaining means for retaining said movable support bars in said second endless conveyor brackets, and return means extending between lower portions of said runs for returning said movable supports to said first endless conveyor and retraction of said loops.

2. Apparatus as claimed in claim 1, wherein the web is perforated.

3. The apparatus of claim 1 wherein said movable support bars are in the form of slats.

4. The apparatus of claim 1 wherein said retaining means includes pivotal latch members adjacent said second endless conveyor run.

5. The apparatus of claim 4 wherein said retaining means includes upstanding guides generally coplanar with said second endless conveyor bracket and disposed along said second endless conveyor upstanding run starting adjacent said latch members.

6. The apparatus of claim 1 wherein said retaining means includes upstanding guides generally coplanar with said second endless conveyor bracket and disposed along said second endless conveyor upstanding run.

7. The apparatus of claim 1 together with gaseous medium supply means associated with said second endless conveyor for supplying a gaseous medium into said loops.

8. The apparatus of claim 7 wherein there are heater means generally within said second endless conveyor for heating said supplied gaseous medium.

9. The apparatus of claim 7 wherein there are heater means generally within said second endless conveyor for heating said supplied gaseous medium and deflectors for deflecting a portion only of said gaseous medium to said heater means.

10. The apparatus of claim 7 together with gaseous medium exhaust means associated with said first endless conveyor.

11. The apparatus of claim 1 together with a stacking device for receiving sheets from said apparatus.

12. The apparatus of claim 1 wherein said return means include return belts having drive catches, said return belts having a length equal to a unit multiple of said movable support bar movement, and a like number of drive catches.

13. The apparatus of claim 12 wherein said feed means include feed belts, single drive means for said feed belts and said return belts, and a free wheeling connection between said feed belt drive and said return belt drive.

* * * * *